United States Patent
Kimura

(10) Patent No.: US 12,516,643 B2
(45) Date of Patent: Jan. 6, 2026

(54) VEHICLE CONTROL METHOD AND VEHICLE CONTROL DEVICE

(71) Applicant: NISSAN MOTOR CO., LTD., Yokohama (JP)

(72) Inventor: Yoshiyasu Kimura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/028,485

(22) PCT Filed: Sep. 25, 2020

(86) PCT No.: PCT/IB2020/000805
§ 371 (c)(1),
(2) Date: Mar. 24, 2023

(87) PCT Pub. No.: WO2022/064238
PCT Pub. Date: Mar. 31, 2022

(65) Prior Publication Data
US 2023/0358187 A1    Nov. 9, 2023

(51) Int. Cl.
*F02D 41/02* (2006.01)
*B60W 10/06* (2006.01)
*B60W 20/40* (2016.01)

(52) U.S. Cl.
CPC ......... *F02D 41/0295* (2013.01); *B60W 10/06* (2013.01); *B60W 20/40* (2013.01)

(58) Field of Classification Search
CPC ....... B60L 50/10; B60W 10/06; B60W 20/00; B60W 20/40; Y02T 10/12; Y02T 10/7072; F02D 2200/0814; F02D 41/0295; F02D 41/123; F02D 41/1454; F02D 41/1476; F02D 41/2474
See application file for complete search history.

(56) References Cited

U.S. PATENT DOCUMENTS 6,766,640 B2   7/2004  Ishizuka et al.
8,108,130 B2   1/2012  Scheuerer
(Continued)

FOREIGN PATENT DOCUMENTS

DE   10 2013 201 316 A1   8/2013
JP        2623791      *  6/1997
(Continued)

*Primary Examiner* — Jacob M Amick
(74) *Attorney, Agent, or Firm* — Foley & Lardner LLP

(57) ABSTRACT

A vehicle includes an internal combustion engine, an exhaust purification catalyst, and an air fuel ratio sensor. The internal combustion engine is structured to be motored by an electric motor generator. The exhaust purification catalyst is structured to purify exhaust gas of the internal combustion engine. The air fuel ratio sensor is located upstream of the exhaust purification catalyst and structured to sense an air fuel ratio. When a quantity of oxygen stored in the exhaust purification catalyst is larger than a reference value, it is determined that inflow of oxygen into the exhaust purification catalyst has an insignificant effect on exhaust performance. Then, fuel injection of the internal combustion engine is stopped, the internal combustion engine is motored, and air fuel ratio learning is performed for learning of a sensed value of the air fuel ratio sensor.

15 Claims, 9 Drawing Sheets

(56) References Cited

U.S. PATENT DOCUMENTS

| | | |
|---|---|---|
| 9,211,787 B2 | 12/2015 | Ledermann et al. |
| 2002/0052266 A1 | 5/2002 | Suzuki et al. |
| 2005/0193722 A1 | 9/2005 | Fujiwara et al. |
| 2010/0139245 A1 | 6/2010 | Scheuerer |
| 2013/0192210 A1* | 8/2013 | Nakano ............... F02D 41/1475 60/276 |
| 2015/0101328 A1 | 4/2015 | Surnilla et al. |
| 2015/0142231 A1 | 5/2015 | Ledermann et al. |

FOREIGN PATENT DOCUMENTS

| | | |
|---|---|---|
| JP | 2002-070611 A | 3/2002 |
| JP | 2002-089303 A | 3/2002 |
| JP | 2002-201983 A | 7/2002 |
| JP | 2003-148200 A | 5/2003 |
| JP | 2004-019519 A | 1/2004 |
| JP | 200609674 * | 1/2006 |
| JP | 2011-252419 A | 12/2011 |
| JP | 2013-100821 A | 5/2013 |
| JP | 2013-209043 A | 10/2013 |
| JP | 2020-082929 A | 6/2020 |
| WO | WO-2008/071500 A1 | 6/2008 |

* cited by examiner

| | RICH-SIDE VARIATION OF A/F | A/F AFTER VARIATION | ENGINE-OUT EMISSIONS (ppm) |
|---|---|---|---|
| BASE POINT A/F: 33.5 | 0 | 33.5 | 45.5 |
| LEARNING WITH FUEL CUT | 3.73 | 29.77 | 124.4 |
| LEARNING WITH MOTORING | 0.49 | 33.01 | 51.9 |
| EFFECT | — | — | −58% |

VEHICLE CONTROL METHOD AND VEHICLE CONTROL DEVICE

TECHNICAL FIELD

The present invention relates to a vehicle control method and a vehicle control device.

BACKGROUND ART

A patent document 1 discloses an art in which an internal combustion engine is stopped, and thereafter motored until exhaust gas remaining in each cylinder is completely discharged from a combustion chamber, wherein the motoring is to rotate a crankshaft with power of a motor.

According to patent document 1, even with a small quantity of oxygen stored in a catalyst for exhaust purification which is provided in an exhaust passage, the motoring is carried out when the internal combustion engine is stopped. This may adversely affect exhaust performance at a next start of the internal combustion engine due to an increase in the quantity of oxygen stored in the catalyst.

In other words, for motoring an internal combustion engine, there is room for further improvement in suppressing exhaust performance from being adversely affected.

PRIOR ART DOCUMENT(S)

Patent Document(s)

Patent Document 1: Japanese Patent Application Publication No. 2004-19519

SUMMARY OF INVENTION

According to the present invention, a vehicle is configured such that when inflow of oxygen into an exhaust purification catalyst has an insignificant effect on exhaust performance, fuel injection of an internal combustion engine is stopped, the internal combustion engine is motored, and air fuel ratio learning for learning of a sensed value of an air fuel ratio sensor is performed.

According to the present invention, it becomes possible to motor the internal combustion engine without adversely affecting the exhaust performance. Furthermore, it becomes possible to carry out air fuel ratio learning without adversely affecting the exhaust performance.

MODE(S) FOR CARRYING OUT INVENTION

The following describes an embodiment of the present invention in detail with reference to the drawings.

Figure 1:
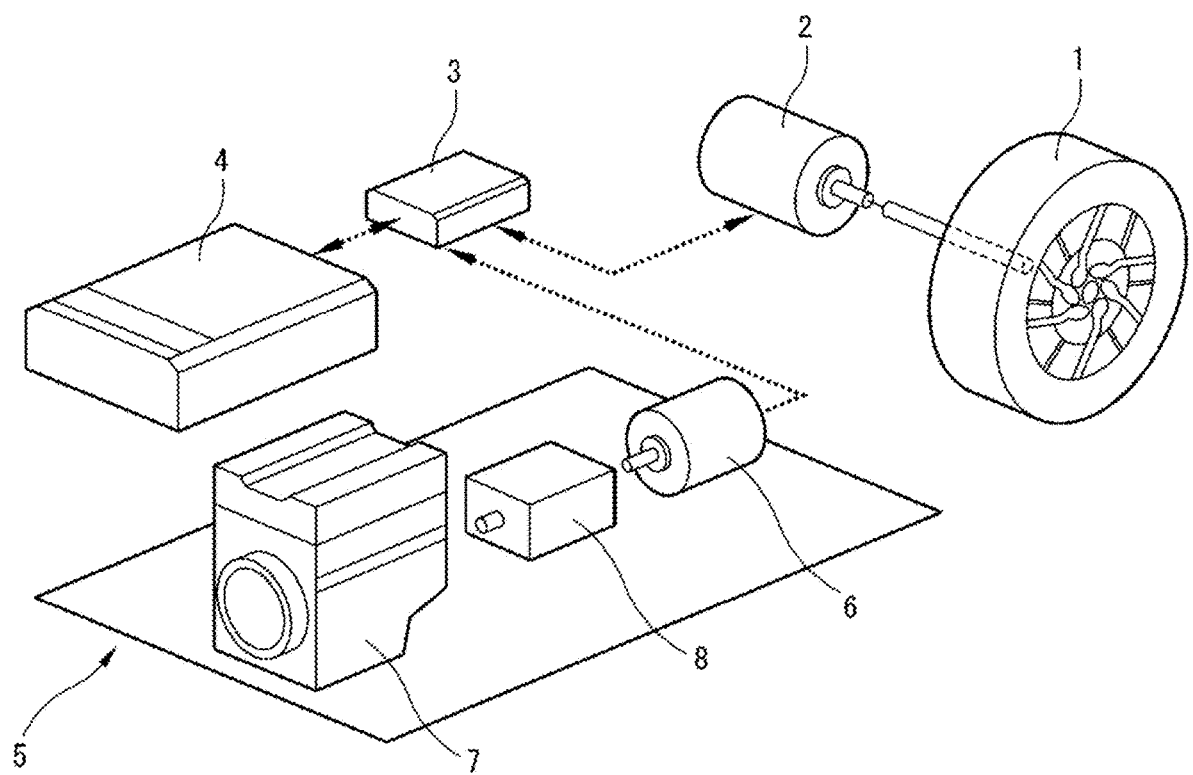
FIG. 1 is an explanatory view showing schematically system configuration of a hybrid vehicle to which the present invention is applied.

FIG. 1 is an explanatory view showing schematically system configuration of a hybrid vehicle to which the present invention is applied.

The hybrid vehicle includes: a driving wheel 1; a driving motor 2 structured to rotationally drive the driving wheel 1; an inverter 3 structured to supply AC power to driving motor 2; and a battery 4 and an electric power generation unit 5 structured to supply electric power to inverter 3.

Vehicle driving wheel 1 is rotationally driven by driving motor 2 as a drive source.

Driving motor 2 is an electric motor such as a synchronous electric motor including a rotor implemented by a permanent magnet.

Driving motor 2 serves as a drive source of the vehicle and is driven by AC power from inverter 3. When the vehicle is decelerating, driving motor 2 functions also as an electric power generator. Specifically, driving motor 2 is capable of charging the battery 4 via inverter 3 with electric power resulting from regenerative energy during vehicle deceleration.

Inverter 3 is a power conversion circuit configured to convert electric power generated by electric power generation unit 5 and driving motor 2 into DC power, and supply the DC power to battery 4. Inverter 3 serves also as a power conversion circuit configured to convert the DC power outputted from battery 4 into AC power, and supply the AC power to driving motor 2.

Battery 4 is a secondary battery structured to be charged with the electric power generated by electric power generation unit 5 and driving motor 2 in DC power form. Battery 4 supplies the charged electric power to driving motor 2 via inverter 3.

Electric power generation unit 5 is generally composed of: an electric power generator 6 as an electric motor generator; an internal combustion engine 7 structured to drive the electric power generator 6 for electric power generation; and a speed reducer 8 disposed between electric power generator 6 and internal combustion engine 7 for connection therebetween.

Namely, in the hybrid vehicle to which the present invention is applied, internal combustion engine 7 is operated to drive the electric power generator 6.

Electric power generation unit 5 is configured to operate (start and stop) independently of driving motor 2.

For example, electric power generator 6 is a synchronous electric motor including a rotor implemented by a permanent magnet.

Electric power generator 6 is structured to convert rotational energy generated in internal combustion engine 7 into electric energy, and supply the electric energy to battery 4 and driving motor 2 via inverter 3. When internal combustion engine 7 is started, electric power generator 6 functions also as a starter motor.

Speed reducer 8 is a gearset that includes a plurality of gears not shown, and transmits rotation of internal combustion engine 7 to electric power generator 6 at a predetermined reduction ratio (rotational speed ratio). When electric power generator 6 is employed as a starter motor for internal combustion engine 7, speed reducer 8 transmits rotation of electric power generator 6 to internal combustion engine 7. Internal combustion engine 7 is capable of being motored by electric power generator 6 while the vehicle is running. "Motoring" is an operation to rotate a crankshaft of internal combustion engine 7 by driving the electric power generator 6.

Figures 2, 3:
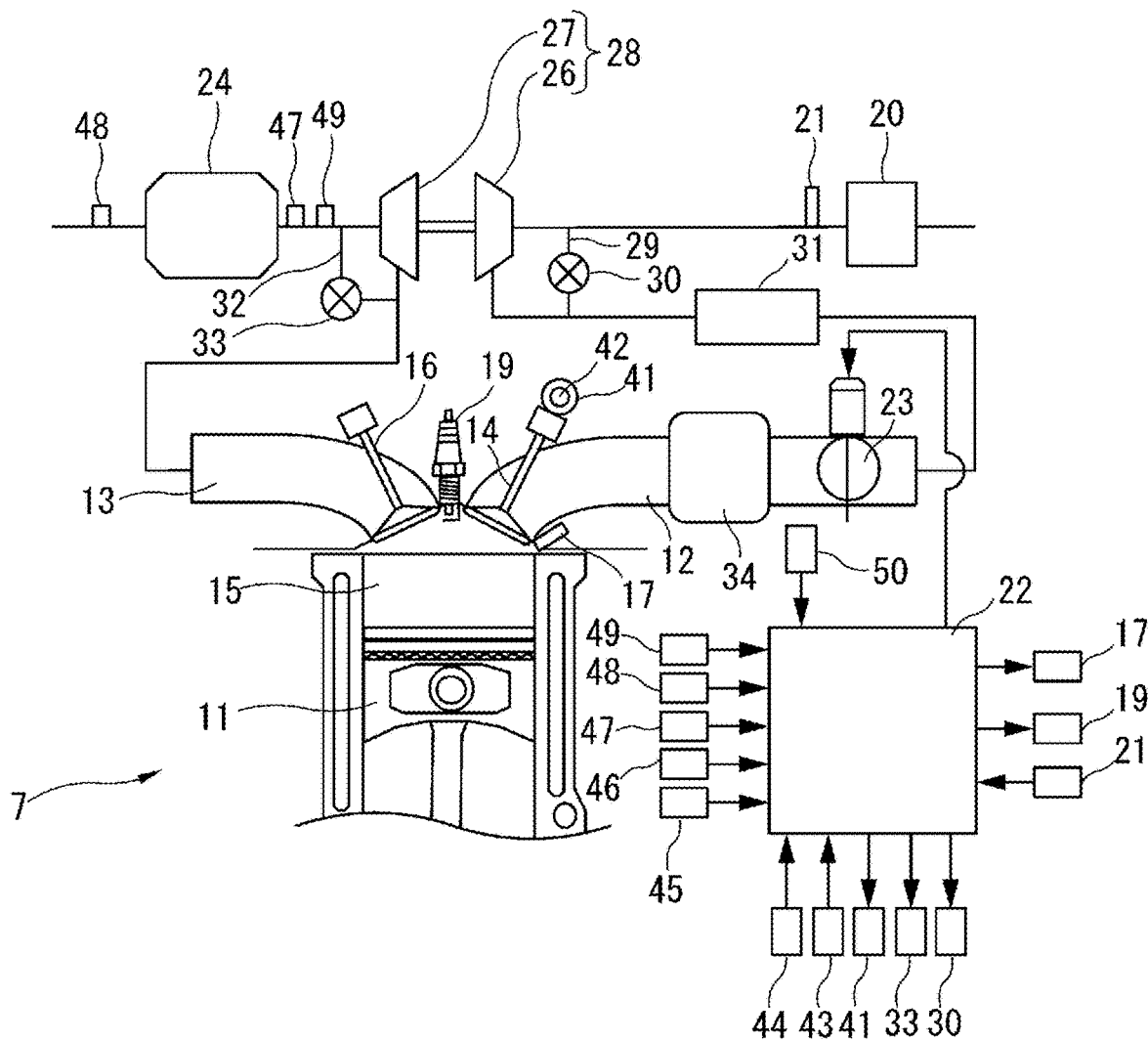
FIG. 2 is an explanatory view showing schematically system configuration of an internal combustion engine.
FIG. 3 is an explanatory view showing a relationship between air fuel ratio learning and exhaust performance.

FIG. 2 is an explanatory view showing schematically system configuration of internal combustion engine 7.

Internal combustion engine 7 is a so-called reciprocating internal combustion engine structured to convert reciprocating linear motion of a piston 11 into rotational motion of the crankshaft not shown for power extraction. Internal combustion engine 7 is structured to vary an air fuel ratio. Internal combustion engine 7 may be started by a dedicated starter motor other than electric power generator 6.

Internal combustion engine 7 includes an intake passage 12 and an exhaust passage 13. Intake passage 12 is connected to a combustion chamber 15 via an intake valve 14. Exhaust passage 13 is connected to combustion chamber 15 via an exhaust valve 16.

Internal combustion engine 7 includes a fuel injection valve 17 structured to inject fuel (gasoline) directly into combustion chamber 15. The fuel injected from fuel injection valve 17 is ignited in combustion chamber 15 by an ignition plug 19. Internal combustion engine 7 may be structured to inject fuel into an intake port of each cylinder.

Intake passage 12 is provided with: an air cleaner 20 structured to collect foreign matter in intake air; an air flow meter 21 structured to measure an amount of intake air; an electric throttle valve 23 whose opening is controlled by a control signal from a control unit 22.

Air flow meter 21 is arranged upstream of throttle valve 23. Air flow meter 21 contains a temperature sensor, and structured to measure a temperature of intake air at an intake air inlet. Air cleaner 20 is arranged upstream of air flow meter 21.

Exhaust passage 13 is provided with an exhaust catalyst device 24 as an exhaust purification catalyst, such as a three-way catalyst, for exhaust purification.

Internal combustion engine 7 further includes a supercharger of an exhaust turbine type (turbocharger) 28 that includes a compressor 26 provided in intake passage 12 and an exhaust turbine 27 provided in exhaust passage 13, wherein compressor 26 and exhaust turbine 27 are arranged coaxially. Compressor 26 is arranged upstream of throttle valve 23, and downstream of air flow meter 21. Exhaust turbine 27 is arranged upstream of exhaust catalyst device 24.

Intake passage 12 is connected to a recirculation passage 29. Recirculation passage 29 includes a first end connected to a section of intake passage 12 upstream of compressor 26, and a second end connected to a section of intake passage 12 downstream of compressor 26.

Recirculation passage 29 is provided with an electric recirculation valve 30 structured to relieve a boost pressure from a downstream side of compressor 26 to an upstream side of compressor 26. Recirculation valve 30 may be implemented by a so-called check valve structured to open only when pressure at the downstream side of compressor 26 is higher than or equal to a predetermined pressure point.

Intake passage 12 is further provided with an intercooler 31 downstream of compressor 26 for cooling intake air compressed (pressurized) by compressor 26, and thereby enhancing charging efficiency. Intercooler 31 is arranged downstream of the downstream end of recirculation passage 29 and upstream of throttle valve 23.

Exhaust passage 13 is connected to an exhaust bypass passage 32 that bypasses exhaust turbine 27 and connects an upstream side of exhaust turbine 27 to a downstream side of exhaust turbine 27. Exhaust bypass passage 32 includes a downstream end connected to a section of exhaust passage 13 upstream of exhaust catalyst device 24. Exhaust bypass passage 32 is provided with an electric waste gate 33 structured to control a flow rate of exhaust gas in the exhaust bypass passage 32. Waste gate valve 33 is structured to allow a part of exhaust gas, which is to be guided to exhaust turbine 27, to bypass to the downstream side of exhaust turbine 27, and thereby control the boost pressure of internal combustion engine 7.

FIG. 1 shows a collector section 34 of intake passage 12. If internal combustion engine 7 is a multi-cylinder internal combustion engine, intake passage 12 includes an intake manifold branched for each cylinder in a section downstream of collector section 34.

Internal combustion engine 7 includes a valve operating mechanism for intake valve 14, which is implemented by an intake-side variable valve mechanism 41 structured to vary valve timing (opening and closing timings) of intake valve 14.

Intake-side variable valve mechanism 41 is a variable phase mechanism structured to continuously advance and retard a phase of a central angle of lifting of intake valve 14 (with respect to the crankshaft not shown). The variable phase mechanism is structured as publicly known from Japanese Patent Application Publication No. 2002-89303 and others, and includes an intake camshaft 42 for driving the intake valve 14 to open and close, wherein the phase of intake camshaft 42 is made to advance and retard with respect to the crankshaft not shown.

Exhaust valve 16 is provided with a valve operating mechanism of a general direct-acting type. Accordingly, exhaust valve 16 has a constant lift operating angle, and a constant lift central angle phase.

Intake-side variable valve mechanism 41 is hydraulically driven or so, and is controlled by a control signal from control unit 22. Namely, control unit 22 serves as a control section to control intake-side variable valve mechanism 41. Control unit 22 is configured to control the valve timing of intake valve 14 variably. Intake-side variable valve mechanism 41 is structured to vary the closing timing of intake valve 14, and thereby vary the amount of air in the cylinder.

Intake-side variable valve mechanism 41 may be of a type capable of varying the opening timing and closing timing of intake valve 14 independently of each other. Intake-side variable valve mechanism 41 is not limited to the type being hydraulically driven, but may be electrically driven by an electric motor or the like.

Intake-side variable valve mechanism 41 may be a variable lift operation angle mechanism structured to vary the lift amount and operation angle of intake valve 14. The variable lift operating angle mechanism is structured as publicly known from Japanese Patent Application Publication No. 2002-89303 and others to expand and contract the lift amount and operating angle of intake valve 14 simultaneously and continuously.

Furthermore, intake-side variable valve mechanism 41 may be composed of a variable phase mechanism for continuously advancing or retarding the phase of the lift central angle of intake valve 14, and a variable lift operation angle mechanism for varying the lift amount and operating angle of intake valve 14.

Control unit 22 is a well-known digital computer including a CPU, a ROM, a RAM, and an input/output interface.

Control unit 22 is configured to receive input of a sensing signal from air flow meter 21, and also sensing signals from various sensors and others such as an intake camshaft position sensor 43 for sensing the valve timing of intake valve 14, a vehicle speed sensor 44 for sensing the vehicle speed, a crank angle sensor 45 for sensing a crank angle of the crankshaft, an accelerator opening sensor 46 for sensing an amount of depression of an accelerator pedal, an A/F sensor 47 and an oxygen sensor 48 for sensing the air fuel ratio, a pressure sensor 49 as a pressure sensing section for sensing a pressure applied to A/F sensor 47, a humidity sensor 50 as a humidity sensing section for sensing the humidity of intake air.

Intake-side camshaft position sensor 43 senses the phase of intake camshaft 42 with respect to the crankshaft.

Vehicle speed sensor 44 serves as a vehicle speed measuring section.

Crank angle sensor 45 is capable of measuring the engine speed of internal combustion engine 7.

Accelerator opening sensor 46 is capable of measuring an accelerator opening that is an operation amount of the accelerator pedal, and an accelerator change speed that is an operation speed of the accelerator pedal. Accelerator opening sensor 46 serves as an accelerator operation quantity measuring section.

A/F sensor 47 is a so-called wide-range air fuel ratio sensor having a substantially linear output characteristic with respect to the exhaust air fuel ratio, and is arranged in a section of exhaust passage 13 upstream of exhaust catalyst device 24. Specifically, A/F sensor 47 is located upstream of exhaust catalyst device 24 and downstream of the downstream end of exhaust bypass passage 32.

Oxygen sensor 48 is a sensor whose output voltage changes in an ON/OFF (rich or lean) manner in a narrow range around a stoichiometric air fuel ratio, for sensing only whether the air fuel ratio is rich or lean. Oxygen sensor 48 is arranged in a section of exhaust passage 13 downstream of exhaust catalyst device 24.

Pressure sensor 49 is arranged in a section of exhaust passage 13 upstream of exhaust catalyst device 24, in this example. Specifically, pressure sensor 49 is located upstream of exhaust catalyst device 24 and downstream of the downstream end of exhaust bypass passage 32. Pressure sensor 49 is arranged upstream of and adjacent to A/F sensor 47. Pressure sensor 49 may be arranged in intake passage 12.

Humidity sensor 50 is arranged in a section of intake passage 12 downstream of intercooler 31, in this example. Namely, humidity sensor 50 is located upstream of exhaust catalyst device 24. Humidity sensor 50 may be arranged in a section of exhaust passage 13 upstream of exhaust catalyst device 24.

On the basis of the sensing signals from the various sensors and others, control unit 22 controls optimally the injection amount and injection timing of the fuel injected from fuel injection valve 17, and the ignition timing (of ignition plug 19) and intake air amount, etc. of internal combustion engine 7, and also controls the air fuel ratio of internal combustion engine 7.

Control unit 22 calculates a required engine load of internal combustion engine 7 (the load of internal combustion engine 7), based on the measured value of accelerator opening sensor 46.

Control unit 22 is also configured to measure an SOC (State Of Charge) of battery 4 that is a ratio of remaining charge quantity to charge capacity of battery 4.

Furthermore, control unit 22 calculates a quantity of oxygen stored in exhaust catalyst device 24 based on a sensed value of A/F sensor 47 and a sensed value of oxygen sensor 48. The quantity of oxygen stored in exhaust catalyst device 24 may be calculated in a manner of calculation as publicly known from Japanese Patent Application Publication No. 2013-100821 and others.

The hybrid vehicle of the embodiment is a so-called series hybrid vehicle that runs by driving the driving motor 2 with electric power from electric power generator 6 driven by internal combustion engine 7 and electric power from battery 4. The series hybrid vehicle is configured to drive the internal combustion engine 7 to charge the battery 4, when the SOC of battery 4 gets low while the vehicle is running. Furthermore, in response to a satisfaction of a predetermined stop condition, such as a condition in which the SOC of battery 4 becomes greater than or equal to a predetermined value during running, the series hybrid vehicle stops internal combustion engine 7 that has been driven to charge the battery 4.

The air fuel ratio of internal combustion engine 7 can be controlled with a target air fuel ratio set leaner than the stoichiometric air fuel ratio. In order to accurately perform such lean burn combustion, it is desirable that the accuracy of sensing of the A/F sensor 47 is high.

Accordingly, when a predetermined condition for air fuel ratio learning is satisfied, control unit 22 performs motoring of internal combustion engine 7 with fuel injection from fuel injection valve 17 stopped, and performs air fuel ratio learning in which a sensing signal (sensed value) of A/F sensor 47 at the moment is learned (stored) as a learned value (air fuel ratio learned value) in correspondence with the concentration of oxygen in the air. Namely, control unit 22 serves as a control section to perform air fuel ratio learning.

When internal combustion engine 7 is motored with fuel injection from fuel injection valve 17 stopped, air (oxygen) flows into exhaust catalyst device 24 located downstream of A/F sensor 47. This may increase the quantity of oxygen stored in exhaust catalyst device 24.

In exhaust catalyst device 24, as the quantity of stored oxygen increases, an oxidizing atmosphere is enhanced to adversely affect an NOx purification rate.

For example, under a condition that the quantity of oxygen stored in exhaust catalyst device 24 is greater than a reference value (for example, approximately 100%), the quantity of oxygen stored in exhaust catalyst device 24 remains unchanged, even when the motoring is performed to supply fresh air to exhaust catalyst device 24. Accordingly, under the condition that the quantity of oxygen stored in exhaust catalyst device 24 is greater than the reference value, the presence or absence of the motoring does not lead to the presence or absence of adverse effects in the NOx purification rate after restart of combustion of internal combustion engine 7. Here, the maximum amount of oxygen that can be stored in exhaust catalyst device 24 is defined to be 100%.

Under a condition that the quantity of oxygen stored in exhaust catalyst device 24 is small, the quantity of oxygen stored in exhaust catalyst device 24 increases when the motoring is performed to supply fresh air to exhaust catalyst device 24. Accordingly, under the condition that the quantity of oxygen stored in exhaust catalyst device 24 is small, the NOx purification rate after restart of combustion of internal combustion engine 7 is adversely affected when the motoring is performed.

Namely, increase in the quantity of oxygen stored in exhaust catalyst device 24 may adversely affect the NOx purification rate of exhaust catalyst device 24, and thereby adversely affect the exhaust performance, when internal combustion engine 7 is started.

In view of the foregoing, control unit 22 is configured to perform the air fuel ratio learning, determining that the air fuel ratio learning condition is satisfied, when inflow of oxygen into exhaust catalyst device 24 has an insignificant effect on exhaust performance on the downstream side of exhaust catalyst device 24.

Specifically, when internal combustion engine 7 is stopped, and the quantity of oxygen stored in exhaust catalyst device 24 is greater than or equal to a preset reference value (for example, approximately 100%), control unit 22 according to the first embodiment stops fuel injection of internal combustion engine 7, and performs motoring of internal combustion engine 7 for a predetermined period of time, and thereafter performs the air fuel ratio learning.

FIG. 3 is an explanatory view showing a relationship between air fuel ratio learning and exhaust performance. At a base point air fuel ratio (for example, 33.5), a rich side variation of A/F is defined to be zero.

In case of learning with fuel cut-off, in which the air fuel ratio learning is performed when fuel injection of internal combustion engine 7 is stopped, the rich side variation of A/F sensor 47 is increased due to unburned fuel in the cylinders, so that engine-out emissions are increased to adversely affect the exhaust performance.

On the other hand, in case of learning with motoring, in which the air fuel ratio learning is performed when internal combustion engine 7 is motored, unburned fuel in the cylinders is sufficiently scavenged, and thereby suppressed from affecting, so that the rich side variation of AF sensor 47 is suppressed from increasing.

During the learning with motoring, the amount of unburned fuel remaining around the A/F sensor 47 can be reduced. As compared with the learning with fuel cut-off, the engine-out emissions (EOE), which are emissions discharged from internal combustion engine 7, are suppressed from increasing.

Namely, control unit 22 according to the first embodiment is capable of carrying out the air fuel ratio learning without adversely affecting the exhaust performance. Furthermore, it becomes possible to motor the internal combustion engine 7 without adversely affecting the exhaust performance.

Figure 4:
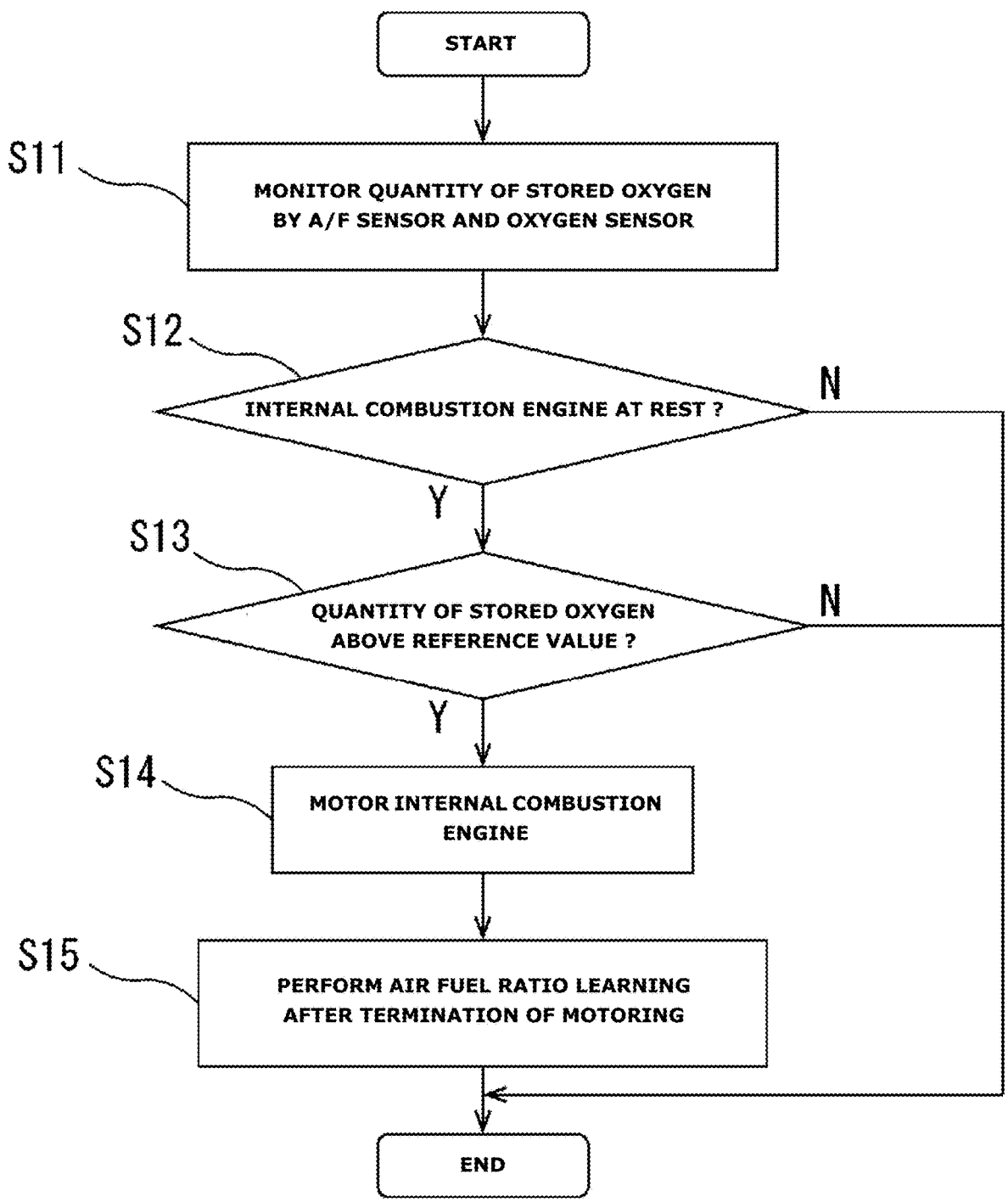
FIG. 4 is a flowchart showing a control flow of air fuel ratio learning according to a first embodiment.

FIG. 4 is a flow chart showing a control flow of air fuel ratio learning according to the first embodiment.

During operation of internal combustion engine 7 such as lean operation in which the air fuel ratio is leaner than the stoichiometric air fuel ratio, the quantity of oxygen stored in exhaust catalyst device 24 is monitored by A/F sensor 47 and oxygen sensor 48 (Step S11). If the quantity of oxygen stored in exhaust catalyst device 24 is greater than or equal to the preset reference value when internal combustion engine 7 is stopped, internal combustion engine 7 is motored for the predetermined period of time (Steps S12, S13, S14). After the motoring of internal combustion engine 7 is terminated, the air fuel ratio learning is performed (Step S15).

The following describes other embodiments of the present invention. The same reference numerals are assigned to the same components as those of the first embodiment, and description thereof is omitted to avoid duplication.

The following describes a second embodiment of the present invention. As in the first embodiment, control unit 22 according to the second embodiment is also configured to perform the air fuel ratio learning, determining that the air fuel ratio learning condition is satisfied, when inflow of oxygen into exhaust catalyst device 24 has an insignificant effect on exhaust performance on the downstream side of exhaust catalyst device 24.

Specifically, when the quantity of oxygen stored in exhaust catalyst device 24 gets greater than or equal to a preset reference value, and increase of the quantity of stored oxygen has an insignificant effect on the exhaust performance, during lean operation of the internal combustion engine 7 in which the air fuel ratio is leaner than the stoichiometric air fuel ratio, control unit 22 according to the second embodiment stops fuel injection of internal combustion engine 7, performs motoring of internal combustion engine 7, and performs the air fuel ratio learning.

The second embodiment thus configured also produces similar advantageous effects as in the first embodiment.

Figure 5:
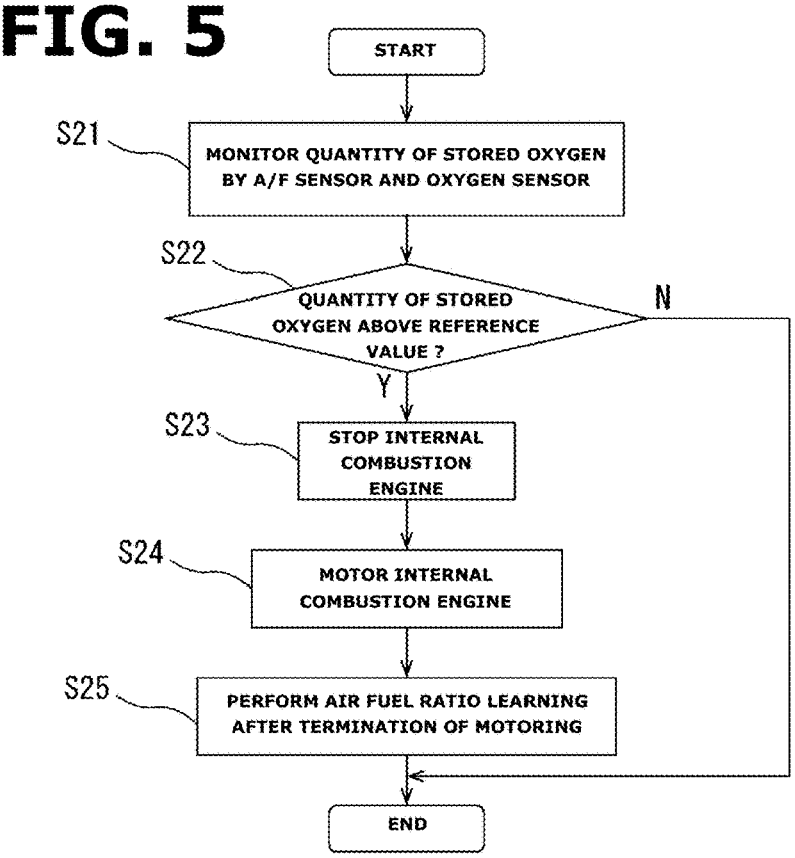
FIG. 5 is a flowchart showing a control flow of air fuel ratio learning according to a second embodiment.

FIG. 5 is a flow chart showing a control flow of air fuel ratio learning according to the second embodiment.

When the quantity of oxygen stored in exhaust catalyst device 24 gets greater than or equal to the preset reference value during lean operation of internal combustion engine 7 in which the air fuel ratio is leaner than the stoichiometric air fuel ratio, internal combustion engine 7 is stopped (Steps S21, S22, S23). Internal combustion engine 7 is motored for a predetermined period of time, and after the motoring of internal combustion engine 7 is terminated, the air fuel ratio learning is performed (Steps S24, S25).

The following describes a third embodiment of the present invention. As in the first embodiment, control unit 22 according to the third embodiment is also configured to perform the air fuel ratio learning, determining that the air fuel ratio learning condition is satisfied, when inflow of oxygen into exhaust catalyst device 24 has an insignificant effect on exhaust performance on the downstream side of exhaust catalyst device 24.

Specifically, control unit 22 according to the third embodiment calculates the quantity of oxygen stored in exhaust catalyst device 24 based on a sensed value of air flow meter 21.

The quantity of oxygen stored in exhaust catalyst device 24 can be calculated from a sensed value of air flow meter 21 and a sensed value of A/F sensor 47, for example. Specifically, it may be calculated using a calculation method as publicly known from Japanese Patent Application Publication No. 2002-70611 and others.

The third embodiment thus configured also produces similar advantageous effects as in the first embodiment.

Figure 6:
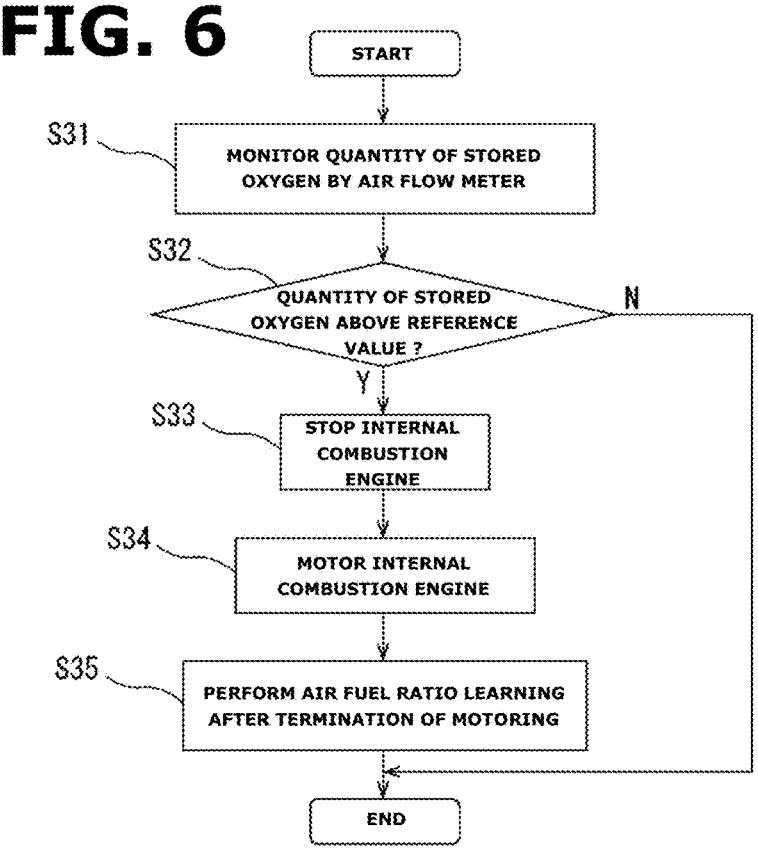
FIG. 6 is a flowchart showing a control flow of air fuel ratio learning according to a third embodiment.

FIG. 6 is a flow chart showing a control flow of air fuel ratio learning according to the third embodiment.

When the quantity of oxygen stored in exhaust catalyst device 24 gets greater than or equal to a preset reference value during lean operation of internal combustion engine 7 in which the air fuel ratio is leaner than the stoichiometric air fuel ratio, internal combustion engine 7 is stopped (Steps S31, S32, S33). Internal combustion engine 7 is motored for a predetermined period of time, and after the motoring of internal combustion engine 7 is terminated, the air fuel ratio learning is performed (Steps S34, S35).

The quantity of oxygen stored in exhaust catalyst device 24 may be calculated based on a sensed value of A/F sensor 47, a sensed value of oxygen sensor 48, and a sensed value of air flow meter 21.

The quantity of stored oxygen thus calculated has an improved accuracy as compared to the quantity of stored oxygen calculated based on a sensed value of A/F sensor 47 and a sensed value of oxygen sensor 48 without using a sensed value of air flow meter 21.

The following describes a fourth embodiment of the present invention. As in the first embodiment, control unit 22 according to the fourth embodiment is also configured to perform the air fuel ratio learning, determining that the air fuel ratio learning condition is satisfied, when inflow of oxygen into exhaust catalyst device 24 has an insignificant effect on exhaust performance on the downstream side of exhaust catalyst device 24.

Specifically, when lean operation of internal combustion engine 7 in which the air fuel ratio is leaner than the stoichiometric air fuel ratio continues for a predetermined period of time, control unit 22 according to the fourth embodiment stops fuel injection of internal combustion engine 7, performs motoring of internal combustion engine 7, and performs the air fuel ratio learning.

When the lean operation continues for the predetermined period of time, the quantity of oxygen stored in exhaust catalyst device 24 can be assumed to be greater than or equal to a preset reference value (for example, approximately 100%).

The fourth embodiment thus configured also produces similar advantageous effects as in the first embodiment.

Figure 7:
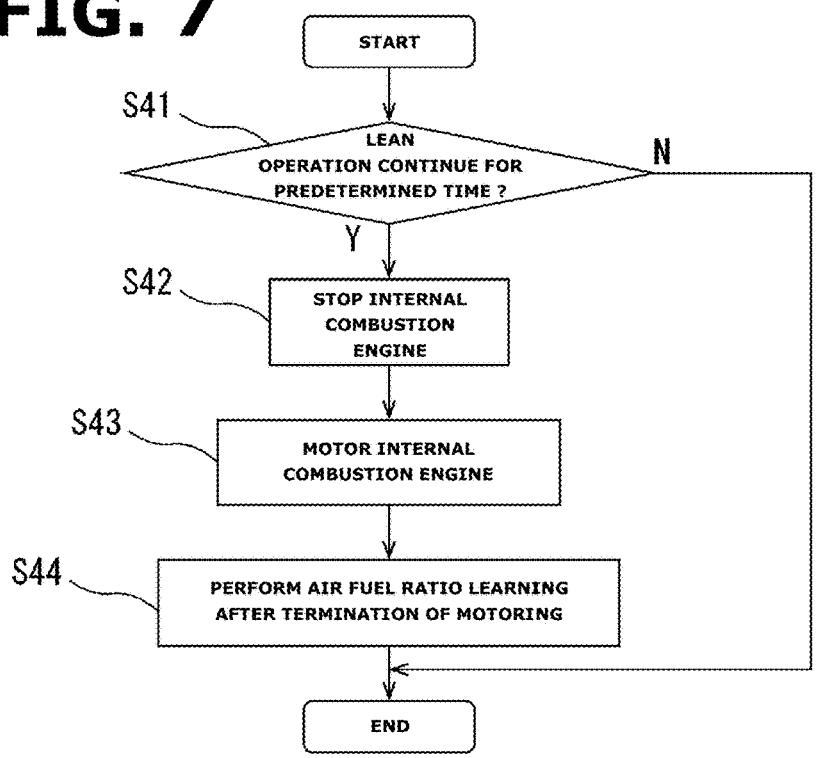
FIG. 7 is a flowchart showing a control flow of air fuel ratio learning according to a fourth embodiment.

FIG. 7 is a flow chart showing a control flow of air fuel ratio learning according to the fourth embodiment.

When lean operation of internal combustion engine 7 in which the air fuel ratio is leaner than the stoichiometric air fuel ratio continues for the predetermined period of time, internal combustion engine 7 is stopped (Steps S41, S42). Internal combustion engine 7 is motored for a predetermined period of time, and after the motoring of internal combustion engine 7 is terminated, the air fuel ratio learning is performed (Steps S43, S44).

The following describes a fifth embodiment of the present invention. As in the first embodiment, control unit 22 according to the fifth embodiment is also configured to perform the air fuel ratio learning, determining that the air fuel ratio learning condition is satisfied, when inflow of oxygen into exhaust catalyst device 24 has an insignificant effect on exhaust performance on the downstream side of exhaust catalyst device 24.

Specifically, when a predetermined stop condition for stopping the internal combustion engine 7 is satisfied while the vehicle is running, control unit 22 according to the fifth embodiment performs motoring of internal combustion engine 7, and after the motoring is terminated, performs the air fuel ratio learning.

For example, the predetermined stop condition for stopping the operating internal combustion engine 7 while the vehicle is running is a condition in which the SOC of battery 4 becomes greater than or equal to the predetermined value as described above.

The fifth embodiment thus configured also produces similar advantageous effects as in the first embodiment.

Furthermore, in the fifth embodiment, the air fuel ratio learning can be performed even while the vehicle is running. This serves to increase opportunities for the air fuel ratio learning. In addition, when the vehicle is running, there is road noise and wind noise, so that the noise resulting from the motoring causes little trouble to passengers of the vehicle, and does not adversely affect passenger comfort.

Figure 8:
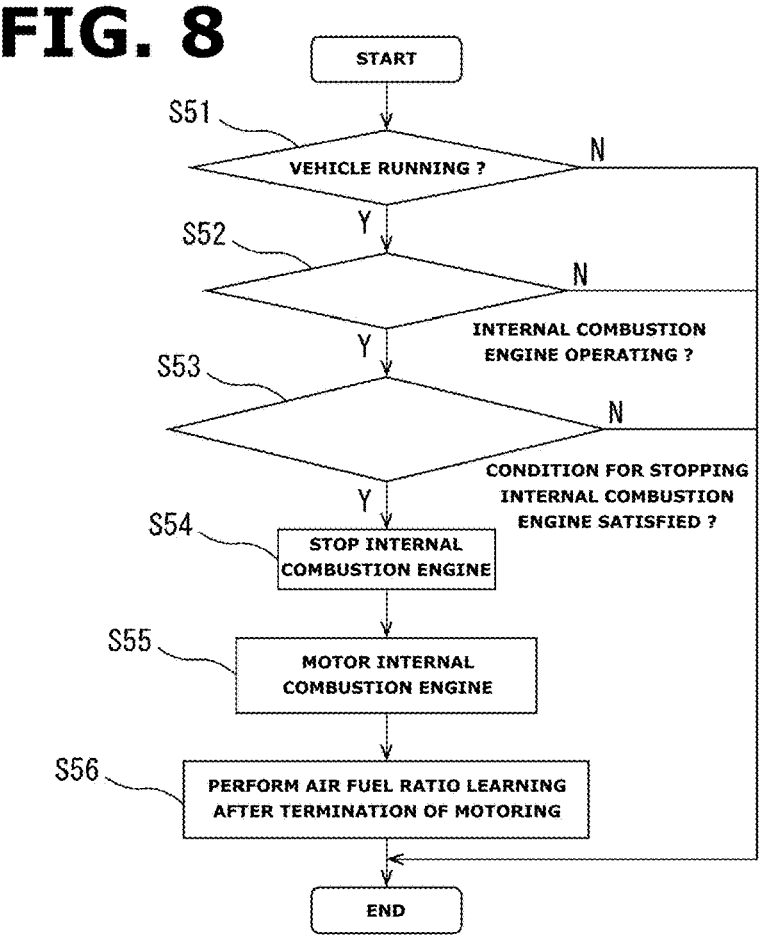
FIG. 8 is a flowchart showing a control flow of air fuel ratio learning according to a fifth embodiment.

FIG. 8 is a flow chart showing a control flow of air fuel ratio learning according to the fifth embodiment.

When the condition for stopping the internal combustion engine 7 is satisfied while the vehicle is running, internal combustion engine 7 is stopped (Steps S51, S52, S53, S54). Internal combustion engine 7 is motored for a predetermined period of time, and after the motoring of internal combustion engine 7 is terminated, the air fuel ratio learning is performed (Steps S55, S56).

The following describes a sixth embodiment of the present invention. As in the first embodiment, control unit 22 according to the sixth embodiment is also configured to perform the air fuel ratio learning, determining that the air fuel ratio learning condition is satisfied, when inflow of oxygen into exhaust catalyst device 24 has an insignificant effect on exhaust performance on the downstream side of exhaust catalyst device 24.

Specifically, when a predetermined stop condition for stopping the internal combustion engine 7 is satisfied while the vehicle is running, control unit 22 according to the sixth embodiment performs motoring of internal combustion engine 7, and during the motoring of internal combustion engine 7, performs the air fuel ratio learning.

Furthermore, in control unit 22 according to the sixth embodiment, a value of pressure applied to A/F sensor 47 is preset (stored) for each operating condition. In accordance with this value of pressure, control unit 22 corrects sensed values of A/F sensor 47 as learned values of the air fuel ratio.

A sensed value of A/F sensor 47 is corrected such that a corrected value decreases (becomes leaner) as the preset pressure value increases.

The sixth embodiment thus configured also produces similar advantageous effects as in the first embodiment.

Sensed values of A/F sensor 47 are affected by the pressure acting on A/F sensor 47. Accordingly, by correcting the sensed values of A/F sensor 47 in accordance with the pressure, the air fuel ratio learning can be carried out with high accuracy.

Figure 9:
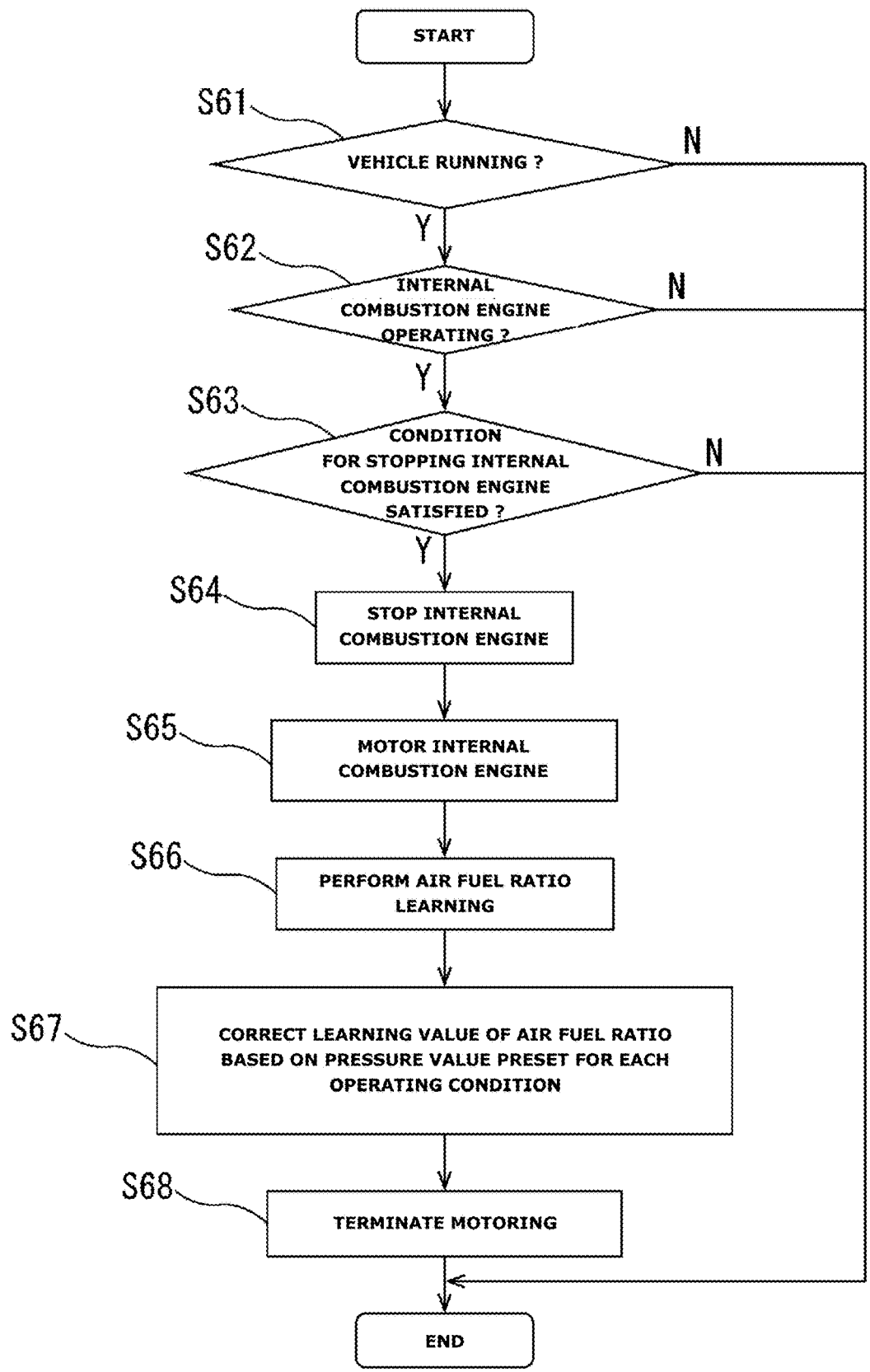
FIG. 9 is a flowchart showing a control flow of air fuel ratio learning according to a sixth embodiment.

FIG. 9 is a flow chart showing a control flow of air fuel ratio learning according to the sixth embodiment.

When the condition for stopping the internal combustion engine 7 is satisfied while the vehicle is running, internal combustion engine 7 is stopped (Steps S61, S62, S63, S64). Internal combustion engine 7 is motored for a predetermined period of time (Step S65). During the motoring of internal combustion engine 7, the air fuel ratio learning is performed, and the air fuel ratio learned value is corrected in accordance with the pressure applied to air fuel ratio sensor 47 (Steps S66, S67, S68).

The following describes a seventh embodiment of the present invention. As in the first embodiment, control unit 22 according to the seventh embodiment is also configured to perform the air fuel ratio learning, determining that the air fuel ratio learning condition is satisfied, when inflow of oxygen into exhaust catalyst device 24 has an insignificant effect on exhaust performance on the downstream side of exhaust catalyst device 24.

Specifically, when a predetermined stop condition for stopping the internal combustion engine 7 is satisfied while the vehicle is running, control unit 22 according to the seventh embodiment performs motoring of internal combustion engine 7, and during the motoring of internal combustion engine 7, performs the air fuel ratio learning.

Furthermore, in accordance with a sensed value of humidity sensor 50, control unit 22 according to the seventh embodiment corrects a sensed value of A/F sensor 47 as a learned value of the air fuel ratio.

The sensed value of A/F sensor 47 is corrected such that a corrected value decreases (becomes leaner) as the humidify sensed by humidity sensor 50 increases.

The seventh embodiment thus configured also produces similar advantageous effects as in the first embodiment.

Sensed values of A/F sensor 47 are affected by humidity. Accordingly, by correcting the sensed values of A/F sensor 47 in accordance with the humidity sensed by humidity sensor 50, the air fuel ratio learning can be carried out with high accuracy.

Figure 10:
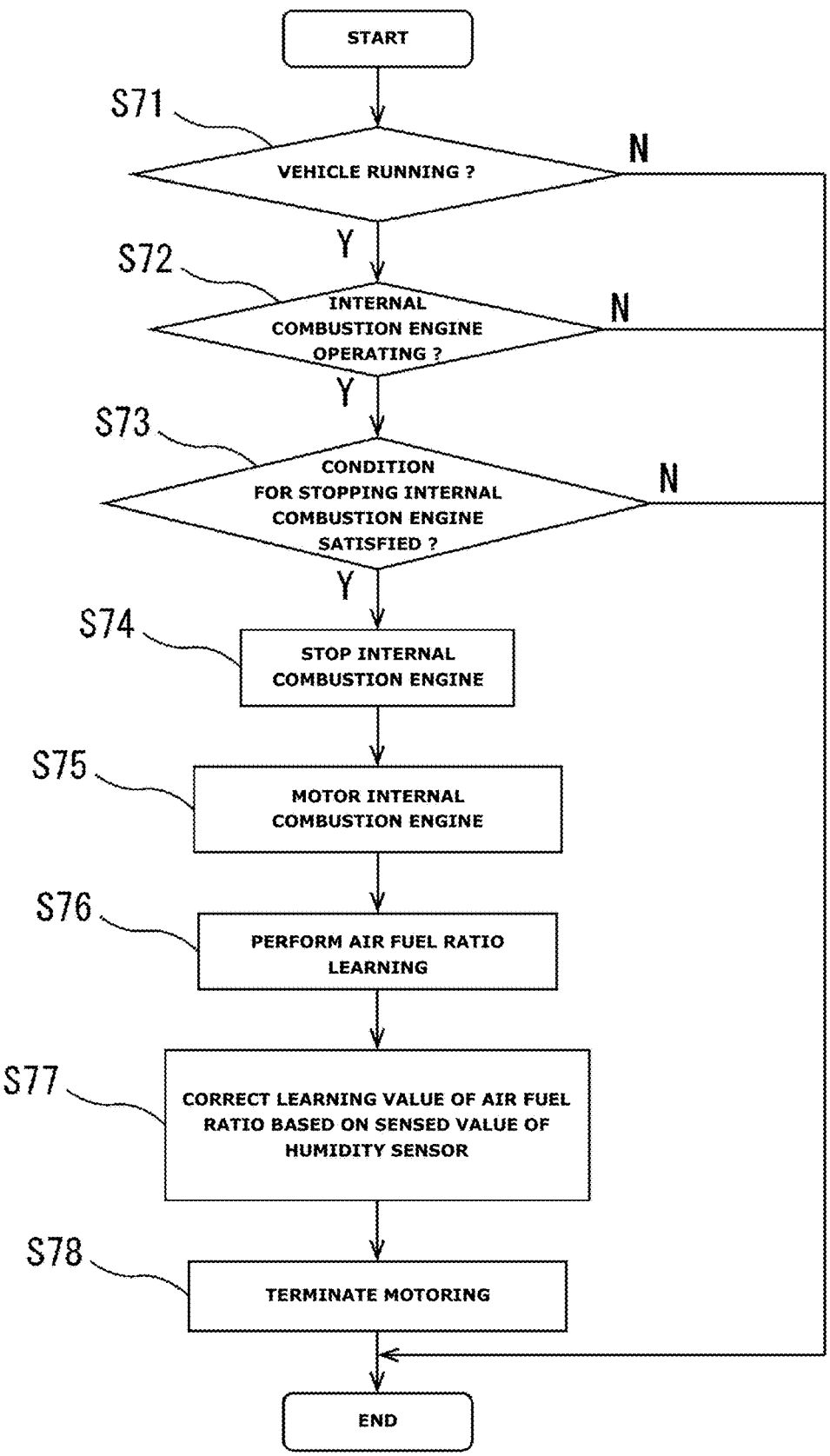
FIG. 10 is a flowchart showing a control flow of air fuel ratio learning according to a seventh embodiment.

FIG. 10 is a flow chart showing a control flow of air fuel ratio learning according to the seventh embodiment.

When the condition for stopping the internal combustion engine 7 is satisfied while the vehicle is running, internal combustion engine 7 is stopped (Steps S71, S72, S73, S74). Internal combustion engine 7 is motored for a predetermined period of time (Step S75). During the motoring of internal combustion engine 7, the air fuel ratio learning is performed, and the air fuel ratio learned value is corrected in accordance with the humidity sensed by humidity sensor 50 (Steps S76, S77, S78).

The following describes an eighth embodiment of the present invention. As in the first embodiment, control unit 22 according to the eighth embodiment is also configured to perform the air fuel ratio learning, determining that the air fuel ratio learning condition is satisfied, when inflow of oxygen into exhaust catalyst device 24 has an insignificant effect on exhaust performance on the downstream side of exhaust catalyst device 24.

Specifically, when a predetermined stop condition for stopping the internal combustion engine 7 is satisfied while the vehicle is running, control unit 22 according to the eighth embodiment performs motoring of internal combustion engine 7, and during the motoring of internal combustion engine 7, performs the air fuel ratio learning.

Furthermore, in accordance with a sensed value of pressure sensor 49, control unit 22 according to the eighth embodiment corrects a sensed value of A/F sensor 47 as a learned value of the air fuel ratio.

The sensed value of A/F sensor 47 is corrected such that a corrected value decreases (becomes leaner) as the pressure sensed by pressure sensor 49 increases.

The eighth embodiment thus configured also produces similar advantageous effects as in the first embodiment.

Sensed values of A/F sensor 47 are affected by the pressure acting on A/F sensor 47. Accordingly, by correcting the sensed values of A/F sensor 47 in accordance with the sensed values of pressure sensor 49, the air fuel ratio learning can be carried out with high accuracy.

Figure 11:
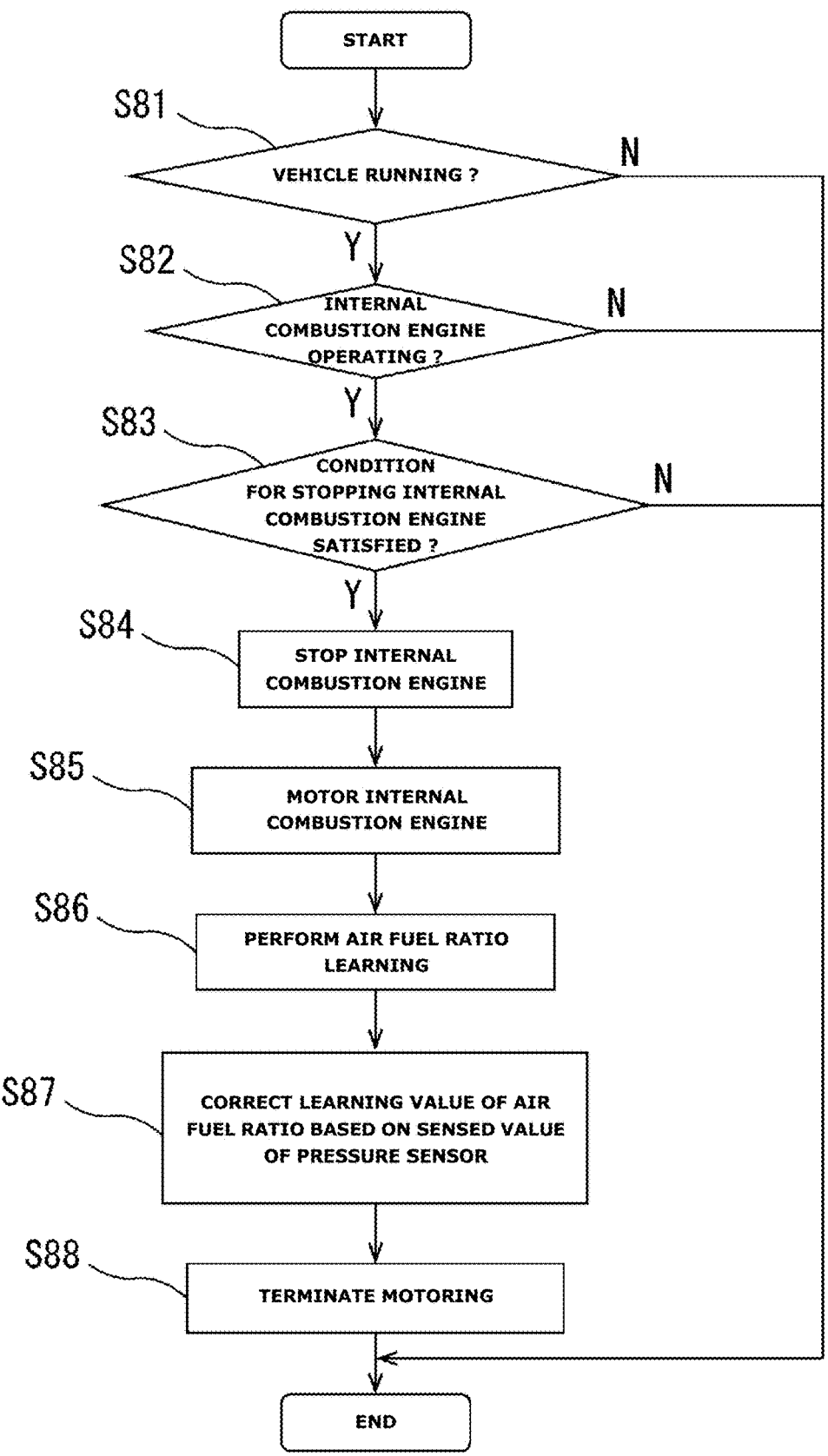
FIG. 11 is a flowchart showing a control flow of air fuel ratio learning according to an eighth embodiment.

FIG. 11 is a flow chart showing a control flow of air fuel ratio learning according to the eighth embodiment.

When the condition for stopping the internal combustion engine 7 is satisfied while the vehicle is running, internal combustion engine 7 is stopped (Steps S81, S82, S83, S84). Internal combustion engine 7 is motored for a predetermined period of time (Step S85). During the motoring of internal combustion engine 7, the air fuel ratio learning is performed, and the air fuel ratio learned value is corrected in accordance with the pressure sensed by pressure sensor 49 (Steps S86, S87, S88).

The following describes a ninth embodiment of the present invention. As in the first embodiment, control unit 22 according to the ninth embodiment is also configured to perform the air fuel ratio learning, determining that the air fuel ratio learning condition is satisfied, when inflow of oxygen into exhaust catalyst device 24 has an insignificant effect on exhaust performance on the downstream side of exhaust catalyst device 24.

Specifically, when a catalyst temperature of exhaust catalyst device 24 is below a predetermined activation temperature at a run start of the vehicle in response to driver's key switch operation, control unit 22 according to the ninth embodiment performs motoring of internal combustion engine 7, and after the motoring is terminated, the air fuel ratio learning is performed.

When the catalyst temperature of exhaust catalyst device 24 is below the predetermined activation temperature, exhaust catalyst device 24 does not function for exhaust gas purification, so the exhaust performance does not depend on whether motoring is carried out or not.

The ninth embodiment thus configured also produces similar advantageous effects as in the first embodiment.

Figure 12:
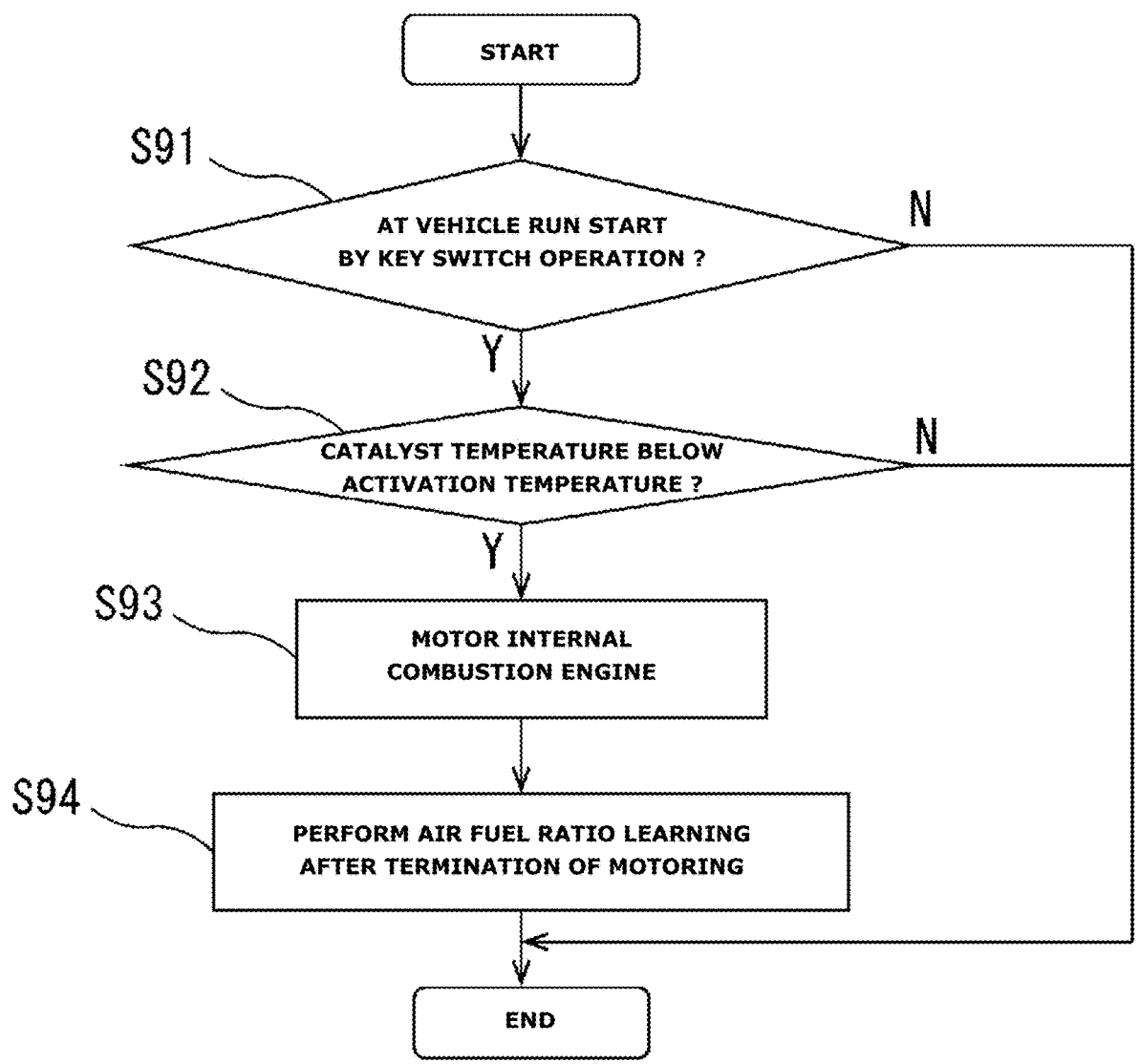
FIG. 12 is a flowchart showing a control flow of air fuel ratio learning according to a ninth embodiment.

FIG. 12 is a flow chart showing a control flow of air fuel ratio learning according to the ninth embodiment.

When the catalyst temperature of exhaust catalyst device 24 is below the predetermined activation temperature at a run start of the vehicle in response to driver's key switch operation, internal combustion engine 7 is motored for a predetermined period of time (Steps S91, S92, S93). After the motoring of internal combustion engine 7 is terminated, the air fuel ratio learning is performed (Steps S94).

Although the specific embodiments of the present invention have been described above, the present invention is not limited to the embodiments, and various modifications may be made without departing from the scope of the invention.

For example, it may be configured such that when the quantity of oxygen stored in exhaust catalyst device 24 becomes greater than or equal to the preset reference value, and inflow of oxygen into exhaust catalyst device 24 has an insignificant effect on exhaust performance on the downstream side of exhaust catalyst device 24, or when the catalyst temperature of exhaust catalyst device 24 is below the activation temperature, fuel injection of internal combustion engine 7 is stopped, internal combustion engine 7 is motored, and after the motoring is terminated, the air fuel ratio learning is performed.

Furthermore, it may be configured such that when the quantity of oxygen stored in exhaust catalyst device 24 becomes greater than or equal to the preset reference value, and inflow of oxygen into exhaust catalyst device 24 has an insignificant effect on exhaust performance on the downstream side of exhaust catalyst device 24, or when the catalyst temperature of exhaust catalyst device 24 is below the activation temperature, fuel injection of internal combustion engine 7 is stopped, internal combustion engine 7 is motored, and while the motoring is performed, the air fuel ratio learning is performed.

During motoring of internal combustion engine 7, throttle valve 23 and wastegate valve 33 of supercharger 28 may be fully opened. This serves to increase the quantity of fresh air (air containing no unburned fuel) passing through the A/F sensor 47, and promote scavenging of unburned fuel near the A/F sensor 47, and allow the air fuel ratio learning to be performed accurately as quickly as possible.

During motoring of internal combustion engine 7, throttle valve 23, wastegate valve 33, intake-side variable valve mechanism 41, and the rotational speed of internal combustion engine 7 may be controlled to control the quantity of air flowing through the A/F sensor 47, and thereby reduce the influence of the pressure on A/F sensor 47. This serves to enhance the accuracy of sensed values of A/F sensor 47, and further enhance the accuracy of air fuel ratio learning.

Moreover, the embodiments described above may be appropriately combined if consistency is maintained.

Each embodiment described above relates to a vehicle control method and a vehicle control device.

The invention claimed is:

1. A vehicle control method for a vehicle, wherein the vehicle includes an internal combustion engine, an exhaust purification catalyst, and an air fuel ratio sensor, wherein the internal combustion engine is structured to be motored by an electric motor generator, wherein the exhaust purification catalyst is structured to purify exhaust gas of the internal combustion engine, and wherein the air fuel ratio sensor is located upstream of the exhaust purification catalyst and structured to sense an air fuel ratio, the vehicle control method comprising:
   determining whether or not a quantity of oxygen stored in the exhaust purification catalyst is larger than a preset reference value;
   in response to a determination that the quantity of oxygen stored in the exhaust purification catalyst is larger than the preset reference value, performing a first process, wherein the first process includes:
      stopping fuel injection of the internal combustion engine;
      motoring the internal combustion engine by the electric motor generator; and
      performing air fuel ratio learning for learning of a sensed value of the air fuel ratio sensor; and
   in response to a determination that the quantity of oxygen stored in the exhaust purification catalyst is not larger than the preset reference value, not performing the first process.

2. The vehicle control method as claimed in claim 1, comprising:
   when the internal combustion engine stops and the quantity of oxygen stored in the exhaust purification catalyst is larger than the preset reference value,
   motoring the internal combustion engine and performing the air fuel ratio learning, with fuel injection of the internal combustion engine stopped.

3. The vehicle control method as claimed in claim 1, comprising:
   when, during lean operation of the internal combustion engine in which the air fuel ratio is leaner than a stoichiometric air fuel ratio, a condition is satisfied in which the quantity of oxygen stored in the exhaust purification catalyst is larger than the preset reference value,
   stopping fuel injection of the internal combustion engine,
   motoring the internal combustion engine, and
   performing the air fuel ratio learning.

4. The vehicle control method as claimed in claim 1, comprising:
   calculating the quantity of oxygen stored in the exhaust purification catalyst, based on at least one of a sensed value of the air fuel ratio sensor, a sensed value of an oxygen sensor, and a sensed value of an air flow meter, wherein the oxygen sensor is located downstream of the exhaust purification catalyst, and wherein the air flow meter is disposed in an intake passage of the internal combustion engine.

5. The vehicle control method as claimed in claim 1, comprising:
   after lean operation of the internal combustion engine in which the air fuel ratio is leaner than a stoichiometric air fuel ratio continues for a predetermined period of time,
   stopping fuel injection of the internal combustion engine,
   motoring the internal combustion engine, and
   performing the air fuel ratio learning.

6. The vehicle control method as claimed in claim 1, comprising:
   when a predetermined stop condition for stopping the internal combustion engine is satisfied while the vehicle is running,
   motoring the internal combustion engine, and
   performing the air fuel ratio learning.

7. The vehicle control method as claimed in claim 1, comprising:
   performing the air fuel ratio learning after termination of motoring of the internal combustion engine or during motoring of the internal combustion engine.

8. The vehicle control method as claimed in claim 1, comprising:
   when a catalyst temperature of the exhaust purification catalyst is below a predetermined activation temperature at a run start of the vehicle by a driver's key switch operation,
   motoring the internal combustion engine, and
   performing the air fuel ratio learning after termination of motoring of the internal combustion engine or during motoring of the internal combustion engine.

9. The vehicle control method as claimed in claim 1, comprising:
   correcting a learned value of the air fuel ratio in accordance with a value of pressure applied to the air fuel ratio sensor.

10. The vehicle control method as claimed in claim 1, wherein the vehicle includes a humidity sensor for sensing humidity of air sucked into the internal combustion engine, the vehicle control method comprising:
    correcting a learned value of the air fuel ratio in accordance with a sensed value of the humidity sensor during the air fuel ratio learning.

11. The vehicle control method as claimed in claim 1, wherein the vehicle includes a throttle valve for controlling an intake air quantity of the internal combustion engine, and a supercharger of an exhaust turbine type for supercharging intake air of the internal combustion engine, the vehicle control method comprising:
    fully opening the throttle valve and a wastegate valve of the supercharger during the motoring of the internal combustion engine.

12. The vehicle control method as claimed in claim 1, wherein the vehicle includes a throttle valve for controlling an intake air quantity of the internal combustion engine, a supercharger of an exhaust turbine type for supercharging intake air of the internal combustion engine, and a variable valve mechanism structured to vary valve timing of an intake valve of the internal combustion engine, the vehicle control method comprising:
    during the motoring of the internal combustion engine, controlling a quantity of air flowing through the air fuel ratio sensor by controlling the throttle valve, a wastegate valve of the supercharger, the variable valve mechanism, and rational speed of the internal combustion engine.

13. A vehicle control device comprising:
    an internal combustion engine structured to be motored by an electric motor generator while a vehicle is running;
    an exhaust purification catalyst structured to purify exhaust gas of the internal combustion engine;

an air fuel ratio sensor located upstream of the exhaust purification catalyst and structured to sense an air fuel ratio; and a control section configured to:
- determine whether or not a quantity of oxygen stored in the exhaust purification catalyst is larger than a preset reference value;
- in response to a determination that the quantity of oxygen stored in the exhaust purification catalyst is larger than the preset reference value, perform a first process, wherein the first process includes:
  - stopping fuel injection of the internal combustion engine;
  - motoring the internal combustion engine by the electric motor generator; and
  - performing air fuel ratio learning for learning of a sensed value of the air fuel ratio sensor; and
- in response to a determination that the quantity of oxygen stored in the exhaust purification catalyst is not larger than the preset reference value, not performing the first process.

14. A vehicle control method for a vehicle, wherein the vehicle includes an internal combustion engine, an exhaust purification catalyst, and an air fuel ratio sensor, wherein the internal combustion engine is structured to be motored by an electric motor generator, wherein the exhaust purification catalyst is structured to purify exhaust gas of the internal combustion engine, and wherein the air fuel ratio sensor is located upstream of the exhaust purification catalyst and structured to sense an air fuel ratio, the vehicle control method comprising:
- when a quantity of oxygen stored in the exhaust purification catalyst is larger than a reference value, determining that inflow of oxygen into the exhaust purification catalyst has an insignificant effect on exhaust performance;
- when inflow of oxygen into the exhaust purification catalyst is determined to have an insignificant effect on exhaust performance,
  - stopping fuel injection of the internal combustion engine,
  - motoring the internal combustion engine, and
  - performing air fuel ratio learning for learning of a sensed value of the air fuel ratio sensor; and
- when a catalyst temperature of the exhaust purification catalyst is below a predetermined activation temperature at a run start of the vehicle by a driver's key switch operation,
  - motoring the internal combustion engine, and
  - performing the air fuel ratio learning after termination of motoring of the internal combustion engine or during motoring of the internal combustion engine.

15. A vehicle control method for a vehicle, wherein the vehicle includes an internal combustion engine, an exhaust purification catalyst, and an air fuel ratio sensor, wherein the internal combustion engine is structured to be motored by an electric motor generator, wherein the exhaust purification catalyst is structured to purify exhaust gas of the internal combustion engine, and wherein the air fuel ratio sensor is located upstream of the exhaust purification catalyst and structured to sense an air fuel ratio, wherein the vehicle includes a throttle valve for controlling an intake air quantity of the internal combustion engine, a supercharger of an exhaust turbine type for supercharging intake air of the internal combustion engine, and a variable valve mechanism structured to vary valve timing of an intake valve of the internal combustion engine, the vehicle control method comprising:
- when a quantity of oxygen stored in the exhaust purification catalyst is larger than a reference value, determining that inflow of oxygen into the exhaust purification catalyst has an insignificant effect on exhaust performance;
- when inflow of oxygen into the exhaust purification catalyst is determined to have an insignificant effect on exhaust performance,
  - stopping fuel injection of the internal combustion engine,
  - motoring the internal combustion engine, and
  - performing air fuel ratio learning for learning of a sensed value of the air fuel ratio sensor; and
- during the motoring of the internal combustion engine, controlling a quantity of air flowing through the air fuel ratio sensor by controlling the throttle valve, a wastegate valve of the supercharger, the variable valve mechanism, and a rational speed of the internal combustion engine.

* * * * *